United States Patent
Losch et al.

[11] 3,710,963
[45] Jan. 16, 1973

[54] APPARATUS FOR EXTRACTING AND TRANSFERRING MATERIALS

[75] Inventors: Heinz Losch, Dulmen; Heinrich Mecklenbrauck, Lunen-Sud, both of Germany

[73] Assignee: Gewerkschaft Eisenhutte Westfalla, Westfalia, Germany

[22] Filed: March 18, 1971

[21] Appl. No.: 125,632

[30] Foreign Application Priority Data

April 24, 1970 Germany..................P 20 20 018.4

[52] U.S. Cl...................214/17 D, 198/137, 198/172
[51] Int. Cl..............................................B65g 65/42
[58] Field of Search.......214/17 D, 15 D; 198/57, 58, 198/159, 137, 171–174, 54, 56

[56] References Cited

UNITED STATES PATENTS

| | | | |
|---|---|---|---|
| 835,288 | 11/1906 | Patterson | 198/54 |
| 1,466,854 | 9/1923 | Smith | 214/15 D |
| 468,406 | 2/1892 | Crepin | 198/173 X |
| 795,166 | 7/1905 | Piez | 198/137 |

Primary Examiner—Robert G. Sheridan
Attorney—Roberts, Cushman & Grover

[57] ABSTRACT

An apparatus for extracting and transferring materials in bunkers or similar storage containers. The apparatus is composed of a framework supported on the floor of the bunker and a scraper chain conveyor with an upper and a lower run. The scraper elements of the lower run are in scraping relationship to the bunker floor and the scraper elements of the upper run are in scraping relationship with inclined floor surfaces separated by an opening disposed centrally of the conveyor. Centrally above the opening there is a roof-shaped cover plate which has apertures alongside its side edges through which material heaped on the cover plate can pass to the upper run of the conveyor. Some of the scraper elements are of greater lateral width than the others and these wider elements extend laterally outwardly beyond the side edges of the cover plate. Material passed to the upper run of the conveyor is thus in turn passed through the opening, after engagement with the scraper elements, to the lower run of the conveyor.

5 Claims, 2 Drawing Figures

PATENTED JAN 16 1973 3,710,963

APPARATUS FOR EXTRACTING AND TRANSFERRING MATERIALS

BACKGROUND TO THE INVENTION

This invention relates to an apparatus for extracting and transferring material and especially to apparatus for delivering pourable materials from bunkers or other containers. Such materials can be bulk material, granular or particulate substances, or minerals, for example.

It is an object of this invention to provide an apparatus which has a high delivery capacity and which is operationally reliable.

It is a further object of this invention to provide an apparatus wherein the conveyance of material can be controlled and a good intermixing of material is achieved during its transferrence. This latter feature is especially desirable where the material is of such nature that it is inclined to adhere, cake or set.

SUMMARY OF THE INVENTION

According to the present invention there is provided an apparatus for extraction and transference of material; said apparatus comprising a scraper-chain conveyor, with an upper and a lower run, at least one entry passage disposed above the upper run of the conveyor and an opening between the upper and lower runs of the conveyor, the material to be transferred being passed through said entry passage to the upper run of the conveyor and thence through said opening to the lower run of the conveyor. The material can be extracted from a bunkered or tipped heap of material and transferred to the conveyor upper run. At this stage the material is conveyed at least partially contrarily of the desired conveying direction, until it drops by way of the opening into the lower run of the conveyor from whence it is now conveyed in the desired direction. This mode of operation is found to produce an especially good intermixing of the material.

In a preferred embodiment the scraper elements of the conveyor can be of such dimensions that the material is reliably moved even if the material should not flow of its own accord through the apparatus. Thus it is ensured that the apparatus works satisfactorily even in the case of pourable materials which are inclined to adhere or cake.

According to a further feature of the invention the opening is disposed between floor surfaces which are inclined towards the opening.

In a preferred construction there is further provided a framework carrying a cover plate of inverted V-shape on which material to be transferred can be loaded, said cover plate having side edges bordering two apertures forming said at least one entry passage and being disposed centrally above said opening. The floor surfaces then preferably have side edges bordering said opening, the side edges of the floor surfaces being disposed inwardly towards the opening relative to the side edges of the cover plate. The floor surface may adjoin downwardly extending walls which laterally define the limits of the lower run of the conveyor. The floor surfaces preferably extend laterally outwardly beyond the side edges of the cover plate relative to the longitudinal center of the opening and preferably lines connecting the adjacent side edges of the cover plates and the floor surfaces are inclined at an angle to the horizontal which is approximately equal to the natural angle of repose of the material to be transferred.

It is expedient for the scraper chain conveyor to have some scraper elements which are of greater lateral width than that of the remaining scraper elements so as to extend outwardly beyond the ends of the remaining scraper elements. These wider scraper elements can have end parts inclined in the longitudinal direction of the conveyor and extending outwardly beyond the side edges of the cover plate relative to the longitudinal center of the opening. In this way the wider scraper elements will reliably entrain the material. To prevent the upper run of the scraper chain conveyor from climbing a guide rail can be provided for the scraper elements beneath the cover plate.

The invention may be understood more readily, and various other features of the invention may become apparent, from consideration of the following description.

BRIEF DESCRIPTION OF DRAWING

An embodiment of the invention will now be described, by way of example only, with reference to the accompanying drawing, wherein.

DESCRIPTION OF PREFERRED EMBODIMENT

Figure 1:
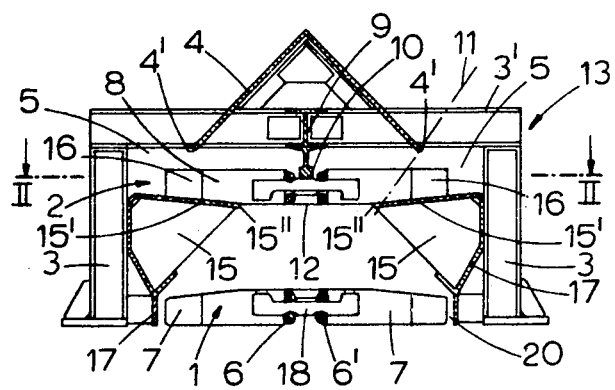
FIG. 1 is a diagrammatic cross-sectional view of an apparatus made in accordance with the invention.

The material extraction and transfer apparatus as depicted in the drawing and generally designated 13 would normally be arranged at the floor region of a bunker, or some other container for material. As shown, the apparatus has a ridged roof or inverted V-shaped cover plate 4 on which material can be heaped. The plate 4 is carried by a framework with pairs of upstanding members 3 adjoined by bridge members 3'. Beneath the cover plate 4 there is arranged a scraper-chain conveyor having a lower run designated 1 and an upper run designated 2. Above the upper run 2 of the conveyor and at the sides 4' of the cover plate 4 there are provided apertures 5 forming material inlet passages.

Figure 2:
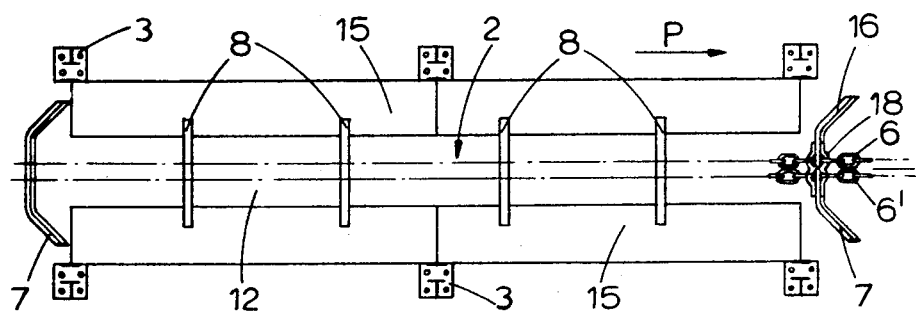
FIG. 2 is a sectional plan view of the apparatus, the section being taken along the line II—II of FIG. 1.

The conveyor is composed of two endless parallel chains 6 and 6' arranged at the central region of the apparatus. Scraper elements 7, 8 are attached to the chains 6, 6' by means of chain locks 18. The elements 7, 8 are spaced apart in a uniform manner and as shown in FIG. 2, the scraper elements 7 have a considerably greater overall width than that of the scraper elements 8. The elements 7 thus have end parts 16 which extend outwardly beyond the lateral ends of the elements 8 and these parts 16 are inclined towards the conveying direction denoted P.

A girder 9 is arranged centrally beneath the cover 4 to which a rail 10 is secured. The rail 10 serves to guide the chain locks 18 and thus prevents climbing of the chains 6, 6' and scrapers 7, 8 in the upper run 2 of the conveyor.

In the lower run 1 of the conveyor the scraper elements 7, 8 run in scraping relationship to a floor 20 of the bunker which receives the apparatus. In the upper run 2 the scraper elements 7, 8 run in scraping relationship to floor surfaces 15' separated by a longitudinal opening 12 disposed centrally of the cover 4. The surfaces 15' are formed at the upper parts of two similar assemblies 15 having depending shaped side walls 17 which are secured or supported on the framework 3', 3, and/or on the floor 20 and laterally define the limits of the lower conveying run 1.

The opening 12 formed between side edges 15" of the surfaces 15' permits material passed to the upper run 2 of the conveyor via the apertures 5 to be passed to the lower run 1 of the conveyor. The surfaces 15' are inclined towards the opening 12 in order to facilitate the transference of the material from the apertures 5 into the opening 12. As shown in FIG. 1, the surfaces 15' and angled end parts 16 of the scraper elements 7 project laterally outwardly beyond the lower side edges 4' of the cover plate 4. In contrast the outer ends of the elements 8 are disposed approximately beneath the side edges 4' of the cover plate 4. The scraper elements 8 can have sufficient width to ensure that the transference of material causes no particular difficulties even in the case of materials which are inclined to adhere, to cake or to set.

A line 11 joining each of the side edges 4' of the cover 4 with the associated side edge 15" of the floor surface 15' therebeneath has an inclination from the horizontal which is approximately equal to the natural angle of repose of the material in question.

In operation, material stored above the apparatus 13, e.g., in a bunker space is extracted by way of the two apertures 5 and falls onto the floor surfaces 15'. Means is preferably provided to control this extraction. The wider scraper elements 7 engage the material with their angled-off end parts 16, and this material is thus entrained and moved inwardly towards the opening 12. Some material is engaged by the narrower scraper elements 8. During this stage in the process the material is conveyed contrarily of the desired conveying direction P. Under the action of the scraper elements 7, 8 and the floor surfaces 15', the material is passed through the opening 12 to the lower run 1 of the conveyor. In the lower run 1 the material is conveyed by the scraper elements 7 and 8 in the direction P to a discharge station where some further conveying means can be provided.

It can be seen that good intermixing of the material takes place on its transference from the apertures 5, to the lower run 1 of the conveyor.

We claim :

1. An apparatus for extracting and transferring material; said apparatus comprising a framework adapted to be supported on the floor of a container for said material; a scraper-chain conveyor with scraper elements forming an upper run and a lower run, some of the scraper elements having a greater lateral width than the remainder of the scraper elements and having end parts which are inclined in the longitudinal direction of the conveyor; the scraper elements of the lower run being disposed during operation of the apparatus, in scraping relationship to said container floor; floor surfaces over which the scraper elements of the upper run of the conveyor pass in scraping relationship thereto; an opening disposed between said floor surfaces with the floor surfaces being inclined towards the opening with the side edges of the floor surfaces bordering said opening; a cover plate of inverted V-shape onto which material can be loaded, said cover plate being disposed centrally above the opening with the side edges of the floor surfaces being disposed inwardly towards the opening relative to the side edges of the cover plate; and entry passages bordered by the side edges of the cover plate and disposed above the upper run of the conveyor with the side edges of the cover plate being disposed inwardly of the end parts of said some scraper elements relative to the longitudinal center of the opening.

2. An apparatus according to claim 1, wherein the floor surfaces extend laterally outwardly beyond the side edges of the cover plate, relative to the longitudinal center of the opening.

3. An apparatus according to claim 1, wherein lines connecting the adjacent side edges of the floor surfaces and the cover plate are inclined to the horizontal at an angle approximately equal to the natural angle of repose of the material.

4. An apparatus according to claim 1, wherein the floor surfaces adjoin downwardly extending walls which laterally define the limits of the lower run of the conveyor.

5. An apparatus according to claim 1, and further comprising a guide rail is disposed above the upper run of the conveyor, the scraper elements being guided by said rail.

* * * * *